US007520157B2

(12) United States Patent
Abe et al.

(10) Patent No.: US 7,520,157 B2
(45) Date of Patent: Apr. 21, 2009

(54) IMPULSE SENSOR (75) Inventors: Tomiya Abe, Hitachi (JP); Akira Suzuki, Hekinan (JP); Motomi Iyoda, Seto (JP); Sotaro Narita, Toyota (JP); Yukio Nakagawa, Toyota (JP)

(73) Assignee: Hitachi Cable, Ltd., Tokyo (JP)

( * ) Notice: Subject to any disclaimer, the term of this patent is extended or adjusted under 35 U.S.C. 154(b) by 170 days.

(21) Appl. No.: 11/649,118

(22) Filed: Jan. 3, 2007

(65) Prior Publication Data
US 2007/0180891 A1 Aug. 9, 2007

(30) Foreign Application Priority Data
Jan. 17, 2006 (JP) .............. 2006-008688

(51) Int. Cl.
*G01N 3/00* (2006.01)
(52) U.S. Cl. .................... 73/12.09; 73/12.01
(58) Field of Classification Search ........... 73/12.01, 73/12.09; 180/274; 280/735; 385/12, 13
See application file for complete search history.

(56) References Cited
U.S. PATENT DOCUMENTS

| 4,594,485 | A | * | 6/1986 | Brown, Jr. ........... 200/61.45 R |
| 4,795,232 | A | * | 1/1989 | Persson ................ 385/13 |
| 4,846,547 | A | * | 7/1989 | Falco et al. ............ 385/13 |
| 5,392,024 | A | * | 2/1995 | Kiuchi et al. .......... 340/436 |
| 6,607,212 | B1 | * | 8/2003 | Reimer et al. .......... 280/735 |
| 6,948,750 | B2 | * | 9/2005 | Federspiel et al. ...... 293/109 |
| 7,116,849 | B2 | * | 10/2006 | Kato .................. 385/12 |
| 7,236,866 | B2 | * | 6/2007 | Takafuji et al. ........ 701/45 |
| 7,364,222 | B2 | * | 4/2008 | Tanabe ............... 296/187.03 |
| 7,373,029 | B2 | * | 5/2008 | Fukushi et al. ......... 385/12 |
| 2003/0164755 | A1 | | 9/2003 | Moritz et al. |
| 2005/0121925 | A1 | | 6/2005 | Federspiel et al. |
| 2006/0017295 | A1 | * | 1/2006 | Danisch .............. 293/120 |
| 2007/0183734 | A1 | * | 8/2007 | Fukushi et al. ......... 385/137 |
| 2007/0198155 | A1 | * | 8/2007 | Danisch .............. 701/45 |

FOREIGN PATENT DOCUMENTS

| DE | 44 07 763 A1 | 9/1995 |
| DE | 103 40 243 A1 | 4/2004 |
| EP | 1 442 943 A2 | 8/2004 |
| EP | 1 726 491 A2 | 11/2006 |
| JP | 5-116592 | 5/1993 |
| JP | A-9-26370 | 1/1997 |
| JP | A-2002-531812 | 9/2002 |

* cited by examiner

*Primary Examiner*—Harshad Patel
*Assistant Examiner*—Freddie Kirkland, III
(74) *Attorney, Agent, or Firm*—Scully, Scott, Murphy & Presser, P.C.

(57) ABSTRACT

An impulse sensor having: a long elastic structure formed of a material to be deformed according to an impulse; a cable insertion hole formed in the elastic structure; and a cable inserted through the cable insertion hole, the cable being operable to cause a variation in propagation energy due to its deformation. A distance from a central line of the cable to an outer surface of the elastic structure is varied in a longitudinal direction of the elastic structure.

12 Claims, 4 Drawing Sheets

BODY TOP VIEW

BODY REAR VIEW

IMPULSE SENSOR

The present application is based on Japanese patent application No. 2006-008688, the entire contents of which are incorporated herein by reference.

BACKGROUND OF THE INVENTION

1. Field of the Invention

This invention relates to an impulse sensor for sensing an impulse.

2. Description of the Related Art

As a conventional impulse sensor, there is an impulse sensor using a cable. This impulse sensor is characterized in that an impulse can be sensed in an entire longitudinal direction of the cable. There are cable sensors of a type using an optical fiber in which propagation light is varied by deformation of the optical fiber, of a type using a cable in which electric potential is varied by pressure, of a type using pressure-sensitive rubber in which electric resistance is varied by pressure, and of a type using longitudinally arranged switches which are turned ON/OFF by an impulse.

The impulse sensor using an optical fiber is caused to sense an impulse by applying, to an optical fiber made of quartz glass or synthetic resin, an impulse, such as pressure, acceleration or strain, causing bend loss and compression loss of the optical fiber, and thereby varying propagation light quantity in the optical fiber (See JP-A-9-26370 and JP-A-2002-531812, for example).

In the field of automobiles and traffic, it is important to quantitatively know automobile collision from the points of view of drivers' safety and pedestrian protection, and the application of the impulse sensors to this field is therefore studied. For example, installing the impulse sensor along a bumper allows sensing an impulse received by the bumper due to vehicle collision.

In the impulse sensor installed along the bumper, there is the problem that an output value of the impulse sensor varies according to portions of the vehicle for the same collision load.

Two reasons considered for this are because of differences in impulse transmission from the bumper to the impulse sensor due to rigidity of the bumper varying according to thickness and structure differences in portions of the bumper in the vehicle width direction, and because of differences in load applied to the impulse sensor due to angle differences between the middle and both right and left ends of the bumper relative to a direction of an impulse received by the bumper.

SUMMARY OF THE INVENTION

Accordingly, it is an object of this invention to provide an impulse sensor, which obviates the above problems, and which corrects detected value differences in portions of the vehicle.

(1) According to one aspect of the invention, an impulse sensor comprises:

a long elastic structure comprising a material to be deformed according to an impulse;

a cable insertion hole formed in the elastic structure; and a cable inserted through the cable insertion hole, the cable being operable to cause a variation in propagation energy due to its deformation, wherein a distance from a central line of the cable to an outer surface of the elastic structure is varied in a longitudinal direction of the elastic structure.

(2) According to another aspect of the invention, an impulse sensor comprises:

a long elastic structure comprising a material to be deformed according to an impulse;

a cable insertion hole formed in the elastic structure; and a cable inserted through the cable insertion hole, the cable being operable to cause a variation in propagation energy due to its deformation, wherein an inside diameter of the cable insertion hole is varied in a longitudinal direction of the elastic structure.

(3) According to another aspect of the invention, an impulse sensor comprises:

a long elastic structure comprising a material to be deformed according to an impulse;

a cable insertion hole formed in the elastic structure; and a cable inserted through the cable insertion hole, the cable being operable to cause a variation in propagation energy due to its deformation, wherein an outside diameter of the cable is varied in a longitudinal direction of the elastic structure.

In the above inventions (1) to (3), the following modifications and changes can be made.

(i) The cable comprises a synthetic resin optical fiber.

(4) According to another aspect of the invention, an impulse sensor comprises:

a long elastic structure comprising a material to be deformed according to an impulse;

a cable insertion hole formed in the elastic structure; and a cable inserted through the cable insertion hole, the cable being operable to cause a variation in propagation energy due to its deformation, wherein two or more of a distance from a central line of the cable to an outer surface of the elastic structure, an inside diameter of the cable insertion hole and an outside diameter of the cable are varied in a longitudinal direction of the elastic structure.

(5) According to another aspect of the invention, an impulse sensor comprises:

a long elastic structure disposed along a front bumper of a vehicle and comprising a material to be deformed according to an impulse;

a cable insertion hole formed in the elastic structure; and a cable inserted through the cable insertion hole, cable being operable to cause a variation in propagation energy due to its deformation, wherein one or more of a distance from a central line of the cable to an outer surface of the elastic structure, an inside diameter of the cable insertion hole and an outside diameter of the cable is different between a middle portion of the front bumper and an end portion of the front bumper in a longitudinal direction of the front bumper.

In the above invention (5), the following modifications and changes can be made.

(ii) The distance from the central line of the cable to the outer surface of the elastic structure is shorter at the middle portion of the front bumper than that at the end portion of the front bumper in the longitudinal direction of the front bumper.

(iii) The inside diameter of the cable insertion hole is smaller at the middle portion of the front bumper then that at the end portion of the front bumper in the longitudinal direction of the front bumper.

(iv) The outside diameter of the cable is greater at the middle portion of the front bumper that that at the end portion of the front bumper in the longitudinal direction of the front bumper.

ADVANTAGES OF THE INVENTION

The invention can have the excellent effect that the impulse sensor is able to vary its sensitivity in the longitudinal direction to correct a detected value.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Impulse Sensor Structure

Figure 1:
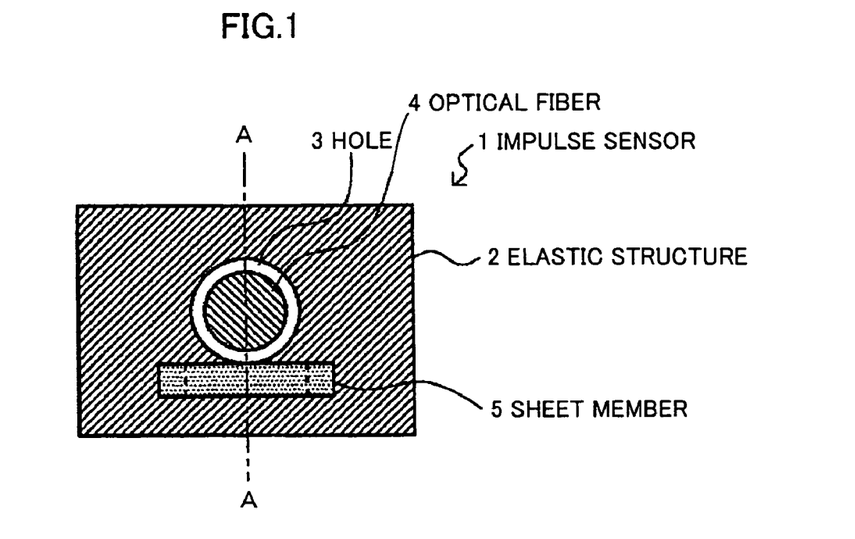
FIG. 1 is a cross-sectional view perpendicular to a cable showing an impulse sensor of the present invention.
Figure 2A:
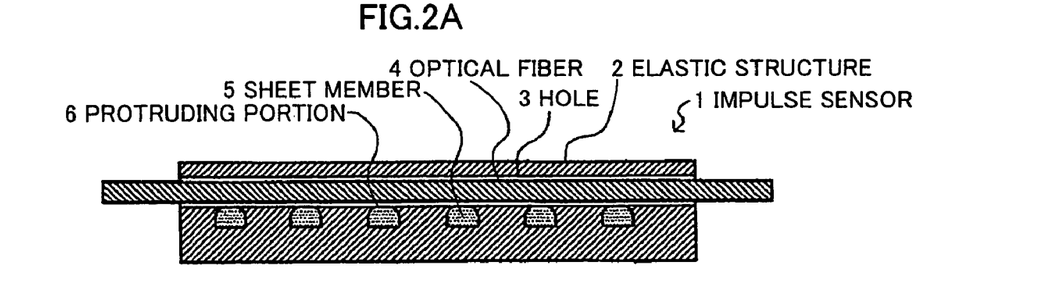
FIGS. 2A and 2B are cross-sectional views along a cable showing impulse sensor of the present inventions respectively.
Figure 2B:
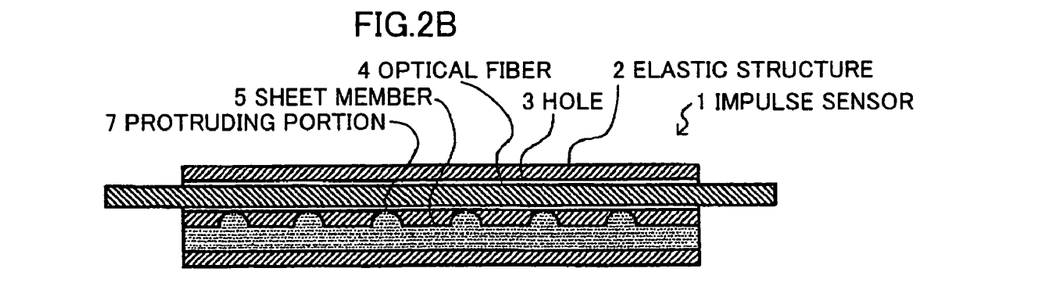

An impulse sensor 1 shown in FIGS. 1 and 2 comprises a long elastic structure 2 formed of a material to be deformed according to an impulse, an optical fiber insertion hole 3 cut in the elastic structure 2, a synthetic resin optical fiber 4 inserted through the hole 3 to cause a variation in propagation light quantity due to its deformation, and a rigid sheet member 5 disposed along the hole 3 in the elastic structure 2. The sheet member 5 has protrusions arranged at specified pitches.

Sheet Member

As shown in FIG. 2A, the protrusions of the sheet member 5 may be formed by vertically cutting through-holes at appropriate longitudinal pitches therein so that protruding portions 6 are left as edges of the through-holes Or as shown in FIG. 2B, the protrusions of the sheet member 5 may be formed by longitudinally providing protruding portions 7 at appropriate pitches.

The sheet member 5 is formed in a thin long sheet shape using a rigid material such as hard plastic, brass (BS), stainless steel (SUS), etc.

Synthetic Resin Optical Fiber

The synthetic resin optical fiber 4 comprises a high refractive index fiber core and low refractive index fiber cladding provided around the fiber core, and is suitable for this impulse sensor.

The fiber core is formed of a core material such as a cross-linked acryl resin (thermosetting acryl resin), a silicon resin, etc. and the fiber cladding is formed of a cladding material such as a moisture-impermeable fluororesin, etc.

For example, the outside diameter of the fiber core is φ 1.5 mm, and the outside diameter of the fiber cladding is φ 2.2 mm, and the fiber core is formed of a cross-linked acryl resin. In this case, the Young modulus of the fiber core is 3 GPa at 20° C.

Elastic Structure

The elastic structure 2 is formed in a thin long stick shape, and is longitudinally provided with the optical fiber insertion hole 3 whose diameter is larger than a fiber cladding diameter of the synthetic resin optical fiber 4, and the sheet member 5 is buried along the hole 3 in the elastic structure 2.

Also, the synthetic resin optical fiber 4 is inserted through the hole 3, and after the insertion of the synthetic resin optical fiber 4, to prevent water or the like from entering the hole 3, both longitudinal ends (not shown) of the hole 3 are sealed.

The material of the elastic structure 2 uses natural rubber, synthetic rubber, or the like, for example. As typical examples of synthetic rubber, there are silicon rubber, ethylene-propylene rubber, etc.

As illustrated, the optical fiber impulse sensor 1 has the structure in which the synthetic resin optical fiber 4 with outside diameter φ 2.2 mm is inserted through the hole 3 cut in the elastic structure 2.

Impulse Sensing Operation

Figure 3:
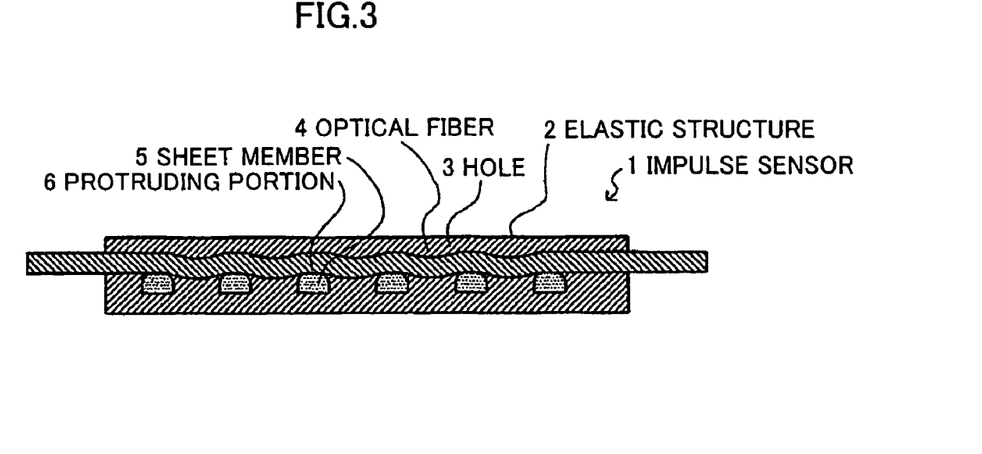
FIG. 3 is a cross-sectional view showing the impulse sensor of FIG. 2A when an impulse is applied thereto.

Next, an impulse sensing operation by this impulse sensor 1 is explained by referring to FIGS. 1-3.

To one end of the synthetic resin optical fiber 4 of the impulse sensor 1 is connected a light-emitting diode (not shown), for example, which emits constant wavelength light as a light source. Light emitted is injected into the synthetic resin optical fiber 4. To the other end of the synthetic resin optical fiber 4 is connected a photodiode (not shown), for example, as a light-receiving element. Light quantity transmitted through the synthetic resin optical fiber 4 is sensed by the photodiode, and a variation in the light quantity is detected, thereby allowing an impulse applied to the impulse sensor 1 to be sensed. The light-emitting diode typically uses a 660 nm wavelength light-emitting diode.

FIG. 2A shows a state of before the impulse sensor 1 receives an impulse. In the state of receiving no impulse, there is no deformation of the elastic structure 2, and the synthetic resin optical fiber 4 does not receive any stress, and therefore has few strains caused.

Let us suppose that this impulse sensor 1 receives an impulse from above in the figure. FIG. 3 shows a state of the impulse sensor 1 when receiving an impulse. In this case, the impulse applied to the impulse sensor 1 is a pressing force applied in the diametrical direction of the synthetic resin optical fiber 4, which causes the lower portion of the synthetic resin optical fiber 4 to abut the protruding portions 6 at predetermined longitudinal pitches, and which therefore causes the protruding portions 6 to deform the synthetic resin optical fiber 4 at the areas respectively abutting the protruding portions 6, based on load. The synthetic resin optical fiber 4 becomes strained and bent at the protruding portions 6, therefore leading to a large transmission loss (optical loss).

Specifically, when the impulse sensor 1 receives an impulse downwardly from above in the figure, the synthetic resin optical fiber 4 is effectively concentratedly stressed at the portions respectively abutting the protruding portions 6, and strain caused in the fiber core and fiber cladding forming the synthetic resin optical fiber 4 causes an increase in transmission loss (optical loss) of the synthetic resin optical fiber 4. The increase of this transmission loss causes a decrease in light quantity passing through the synthetic resin optical fiber 4. Because the increase of this transmission loss is related to the magnitude of the load applied to the impulse sensor 1, by measuring variation with time of the transmission loss, the magnitude of the impulse, the length of time of receiving the impulse, etc. can be sensed.

Figure 4:
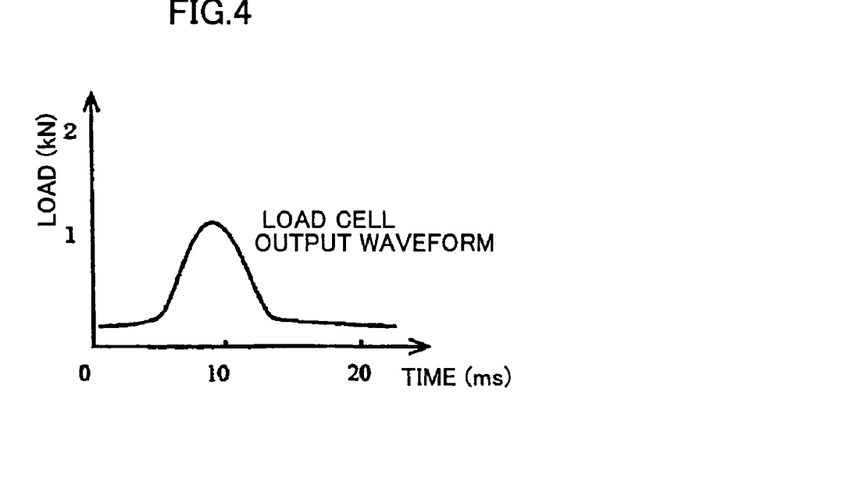
FIG. 4 is a characteristic diagram showing a variation with time of load sensed by a load cell.

FIG. 4 shows a variation with time of load sensed by a conventional impulse sensor load cell. In FIG. 4, the horizontal axis represents time (unit: ms), and the vertical axis represents load (unit: kN) received by the load cell. As seen from the figure, when no impulse is applied, almost no load acts on the load cell, whereas when an impulse is applied, the load acting on the load cell increases to the maximum load received in approximately 10 ms, and subsequently decreases to the state of before the impulse receiving.

Figure 5:
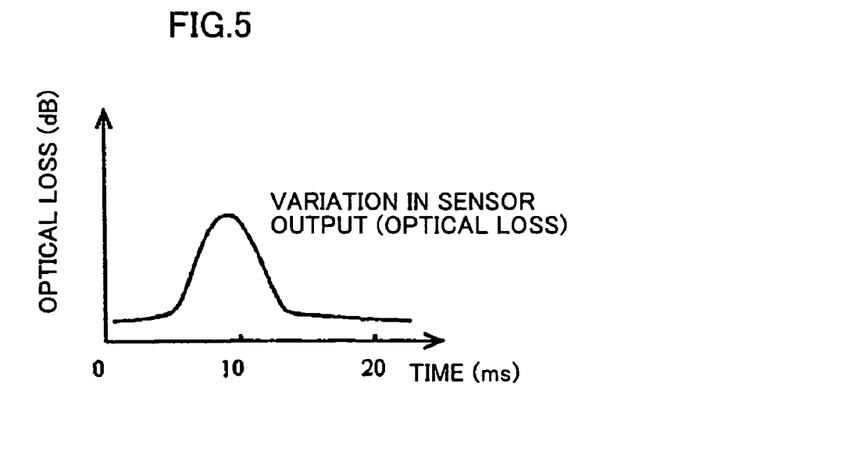
FIG. 5 is a characteristic diagram showing a variation with time of optical loss sensed by the impulse sensor of FIG. 1.

FIG. 5 shows a variation in optical loss of the synthetic resin optical fiber 4 when the same impulse as in the load cell is applied to the impulse sensor 1 of FIG. 1. In FIG. 5, the horizontal axis represents time (unit: ms), and the vertical axis represents optical loss (unit: dB) of the impulse sensor 1. As seen from the figure, when no impulse is applied, the optical loss of the impulse sensor 1 is small, whereas when an impulse is applied, the optical loss of the impulse sensor 1 increases to the maximum optical loss in approximately 10 ms, and subsequently decreases to the state of before the impulse receiving.

From the comparison of the variations with time of FIGS. 4 and 5, it is found that both the variations with time are substantially similar to each other.

This means that the impulse sensor 1 of FIG. 1 is as effective in impulse sensing as the conventional impulse sensor (load cell). That is, the variation with time of the optical loss of the impulse sensor 1 has the pattern similar to the output varying with time of the load cell, and the degree of the optical loss of the impulse sensor 1 corresponds to the degree of the impulse received by the object to be measured.

In this manner, it is verified that an impulse can appropriately be sensed by applying the impulsive load to the impulse sensor 1 and sharply increasing transmission loss (optical loss) in the synthetic resin optical fiber 4.

Because the above-explained impulse sensor 1 senses an impulse received by an optical loss variation through the synthetic resin optical fiber 4, it can sense the impulse without being affected by electromagnetic noise caused or received in the impulse sensor 1—installed location.

Preferred embodiments of this invention will be detailed below.

FIRST EMBODIMENT

Figure 6:
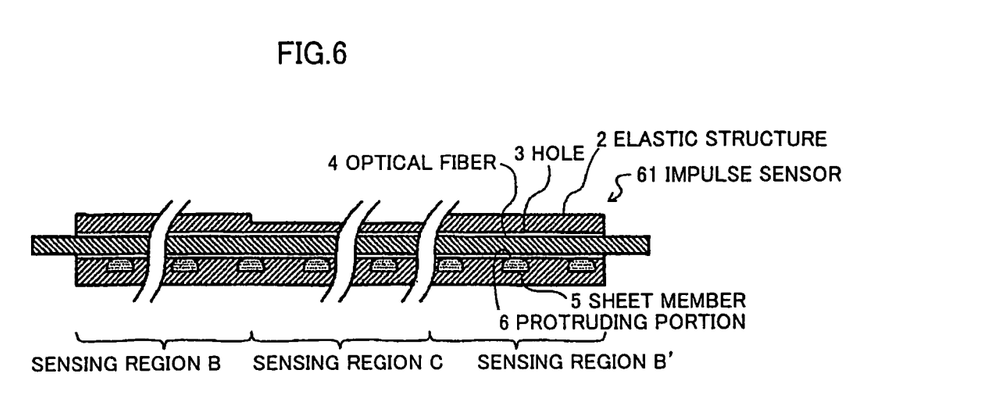
FIG. 6 is a cross-sectional view, along a cable, showing an impulse sensor in a first preferred embodiment of the invention.

As shown in FIG. 6, an impulse sensor 61 according to this invention makes different, in the impulse sensor 1 explained in FIG. 1, the distance from the central line of the synthetic resin optical fiber 4 to outer surface of the elastic structure 2 (=surface positioned opposite the sheet member 5 relative to the optical fiber 4=upper surface in FIG. 6) according to longitudinal portions of the elastic structure 2. The inside diameter of the optical fiber insertion hole 3 is the same in every longitudinal portion, and the inside diameter of the synthetic resin optical fiber 4 is the same in every longitudinal portion, so that, under the condition of the constant inside diameter of the optical fiber insertion hole 3, the elastic structure 2 is thick in the right and left end portions and thin in the middle portion, as shown.

Here, the impulse sensor 61 is longitudinally divided into 3 sensing regions: sensing regions B and B' in the left and right end portions respectively, and sensing region C in the middle portion, as shown. For example, the thickness of the elastic structure 2 in the sensing regions B and B' is 6 mm, and the thickness of the elastic structure 2 in the sensing region C is 4.5 mm.

SECOND EMBODIMENT

Figure 7:
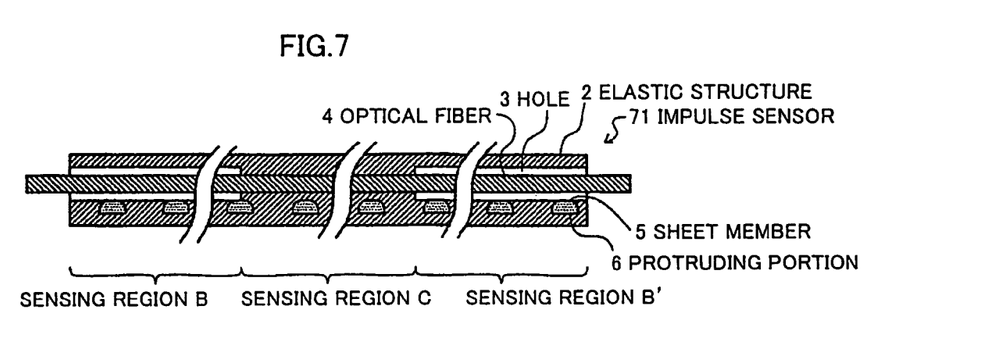
FIG. 7 is a cross-sectional view, along a cable, showing an impulse sensor in a second preferred embodiment of the invention.

As shown in FIG. 7, an impulse sensor 71 according to this invention makes different, in the impulse sensor 1 explained in FIG. 1, the inside diameter of the optical fiber insertion hole 3 according to longitudinal portions of the elastic structure 2. The inside diameter of the optical fiber insertion hole 3 is thick in the right and left end portions and thin in the middle portion, as shown. The outside diameter of the synthetic resin optical fiber 4 is the same in every longitudinal portion. The outer surface of the elastic structure 2 (=surface positioned opposite the sheet member 5 relative to the optical fiber 4=upper surface in FIG. 7) is flat in every longitudinal portion, so that the thickness of the elastic structure 2 varies according to its portions.

Here, the impulse sensor 71 is longitudinally divided into 3 sensing regions: sensing regions B and B' in the left and right end portions respectively, and sensing region C in the middle portion, as shown. For example, the inside diameter of the optical fiber insertion hole 3 in the sensing regions B and B' is 3.0 mm, and the inside diameter of the optical fiber insertion hole 3 in the sensing region C is 2.3 mm.

THIRD EMBODIMENT

Figure 8:
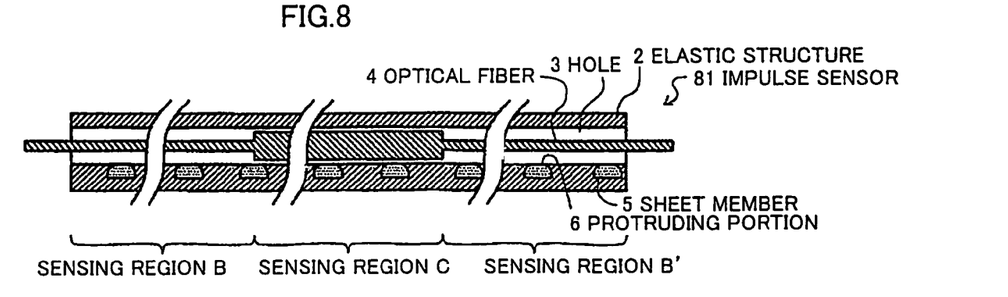
FIG. 8 is a cross-sectional view along a cable showing an impulse sensor in a third preferred embodiment of the invention.

As shown in FIG. 8, an impulse sensor 81 according to this invention makes different, in the impulse sensor 1 explained in FIG. 1, the outside diameter of the synthetic resin optical fiber 4 according to longitudinal portions of the elastic structure 2. The outside diameter of the synthetic resin optical fiber 4 is thin in the right and left end portions and thick in the middle portion, as shown. The inside diameter of the optical fiber insertion hole 3 is the same in every longitudinal portion. The outer surface of the elastic structure 2 (=surface positioned opposite the sheet member 5 relative to the optical fiber 4=upper surface in FIG. 8) is flat in every longitudinal portion, so that the thickness of the elastic structure 2 is the same in every portion.

Here, the impulse sensor 81 is longitudinally divided into 3 sensing regions: sensing regions B and B' in the left and right end portions respectively, and sensing region C in the middle portion, as shown. For example, the outside diameter of the synthetic resin optical fiber 4 in the sensing regions B and B' is 1.8 mm, and the outside diameter of the synthetic resin optical fiber 4 in the sensing region C is 2.2 mm.

In the impulse sensor 61 of FIG. 6, since the elastic structure 2 is thin in the sensing region C, load from the upper portion of FIG. 6 tends to be transmitted to the synthetic resin optical fiber 4, and the sensitivity of the impulse sensor is therefore high. Since the elastic structure 2 is thick in the sensing regions B and B', load from the upper portion of FIG. 6 is unlikely to be transmitted to the synthetic resin optical fiber 4, and the sensitivity of the impulse sensor is therefore low. In order to prevent delay of load transmission due to the recessed portion of the sensing region C, there is disposed a fixing member 101 along the outer surface of the elastic structure 2, as will be described later.

In the impulse sensor 71 of FIG. 7, since a gap is present between the synthetic resin optical fiber 4 and the elastic structure 2 in the sensing regions B and B', after load is applied to the outer surface of the elastic structure 2, it takes time for the gap to be compressed, and the time at which the load is applied to the synthetic resin optical fiber 4 is therefore delayed, in comparison to the sensing region C. Because of this time delay, the sensing regions B and B' are lower in the sensitivity of the impulse sensor to impulses than the sensing region C.

In the impulse sensor 81 of FIG. 8, similarly to the impulse sensor 71 of FIG. 7, since a gap is present between the synthetic resin optical fiber 4 and the elastic structure 2 in the sensing regions B and B', the sensing regions B and B' are lower in the sensitivity of the impulse sensor to impulses than the sensing region C.

While the embodiments of FIGS. 6-8 vary only any one of the distance from the central line of the synthetic resin optical fiber 4 to outer surface of the elastic structure 2, the diameter of the optical fiber insertion hole 3, or the diameter of the synthetic resin optical fiber 4 according to longitudinal portions of the elastic structure 2, any two or more of these may be varied according to longitudinal portions of the elastic structure.

Next, there are explained preferred embodiments for applications to automobiles.

FOURTH EMBODIMENT

Figure 9:
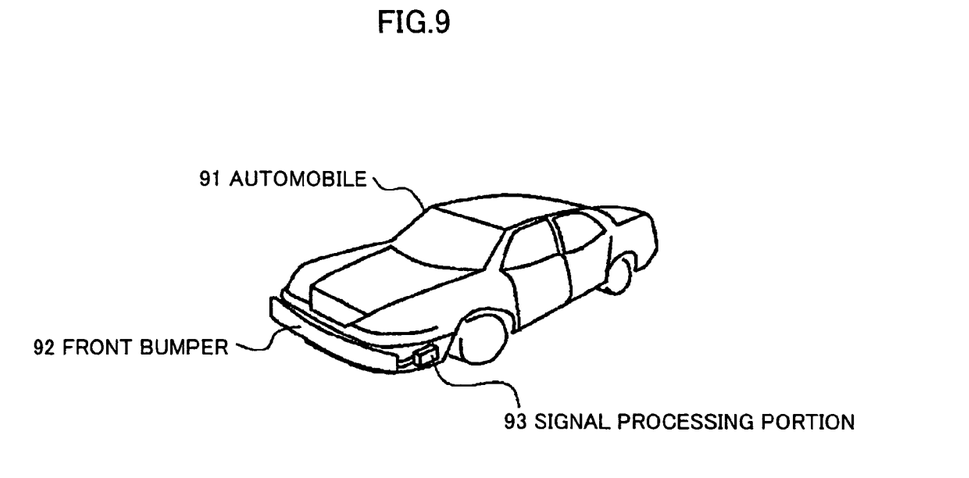
FIG. 9 is a diagram showing appearance of an impulse sensor in a fourth preferred embodiment of the invention.

As shown in FIG. 9, an automobile 91 is provided with a front bumper 92 that extends from its body front to sides. An impulse sensor according to this invention is installed along this front bumper 92 of the vehicle, and comprises a long elastic structure formed of a material to be deformed according to an impulse, a cable insertion hole cut in the elastic structure, and a cable inserted through the hole to cause a variation in propagation energy due to its deformation, and varies any one or more of the distance from the central line of the cable to outer surface of the elastic structure, the distance from the central line of the cable to inner surface of the cable insertion hole (i.e., inside diameter of the cable insertion hole), and the distance from the central line of the cable to outer surface of the cable (i.e., outside diameter of the cable), in the middle portion and in the left and right end portions of the front bumper 92.

Here, it is assumed that the rigidity of the front bumper 92 is small in the middle portion and large in the left and right end portions, and that the sensitivity thereof is higher in the left and right end portions than in the middle portion. The impulse sensors of the embodiments of FIGS. 6-8 are then installed such that the sensing regions B and B' are arranged in the left and right end portions of the front bumper and that the sensing region C in the middle portion.

A signal processing portion 93, containing a light source and a light receiving element, may be provided in any place within the automobile 91.

According to this structure, the high-sensitivity sensing region C is laid in the middle portion of the small-rigidity and low-sensitivity bumper, and the low-sensitivity sensing regions B and B' in the left and right end portions of the large-rigidity and high-sensitivity bumper, thus allowing the impulse sensor to output the same output value for the same collision load.

Where the rigidity of the front bumper 92 is large in the middle portion and small in the left and right end portions, and that the sensitivity thereof is higher in the middle portion than in the left and right end portions, the low-sensitivity sensing region maybe laid in the middle portion of the bumper, and the high-sensitivity sensing regions in the left and right end portions of the bumper.

FIFTH EMBODIMENT

Figure 10:
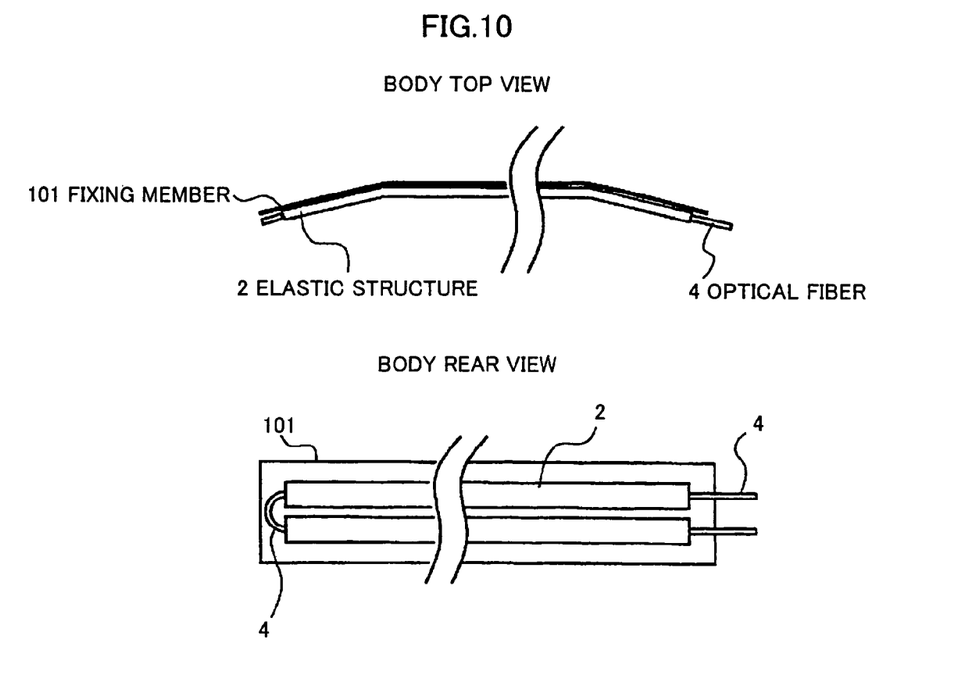
FIG. 10 is top and rear views showing an elastic structure and a fixing member of the impulse sensor of FIG. 9.

As shown in FIG. 10, an elastic structure 2 is fixed to a thin sheet fixing member 101 formed along the bend shape of the bumper, and the fixing member 101 is fixed to the inner side (back side) of the bumper. The upper surface of the elastic structure 2 shown in FIGS. 6-8 is in contact with the fixing member 101.

In this embodiment, the elastic structure 2 is folded and drawn around. Specifically, in the upper half of the fixing member 101, the elastic structure 2 is substantially straightened from the right to left end shown, and is folded with the bare synthetic resin optical fiber 4 at the left end shown, and is substantially straightened from the left to right end shown. In this case, the sensing regions B and B' and the sensing region C explained in FIGS. 6-8 are formed in one direction and then in the opposite direction. The drawing of the synthetic resin optical fiber 4 to a light source and a light receiving element both not shown becomes simple.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An impulse sensor, comprising:
   a long elastic structure comprising a material to be deformed according to an impulse;
   a plurality of protruding portions provided longitudinally along the long elastic structure at a predetermined pitch;
   a cable insertion hole formed in the elastic structure; and
   a cable inserted through the cable insertion hole, the cable being operable to cause a variation in propagation energy due to its deformation,
   wherein a distance from a central line of the cable to an outer surface of the elastic structure is varied in a longitudinal direction of the elastic structure, and
   wherein the sensitivity of the impulse sensor for sensing the impulse is varied in positions longitudinally along the impulse sensor.

2. The impulse sensor according to claim 1, wherein:
   the cable comprises a synthetic resin optical fiber.

3. The impulse sensor according to claim 1, further comprising a plurality of sensitivity sections for sensing the impulse, wherein the plurality of sensitivity section are spaced in positions longitudinally along the elastic structure.

4. An impulse sensor, comprising:
   a long elastic structure comprising a material to be deformed according to an impulse;
   a plurality of protruding portions provided longitudinally along the long elastic structure at a predetermined pitch;
   a cable insertion hole formed in the elastic structure; and
   a cable inserted through the cable insertion hole, the cable being operable to cause a variation in propagation energy due to its deformation,
   wherein an inside diameter of the cable insertion hole is varied in a longitudinal direction of the elastic structure, and
   wherein the sensitivity of the impulse sensor for sensing the impulse is varied in positions longitudinally along the impulse sensor.

5. The impulse sensor according to claim 4, wherein:
the cable comprises a synthetic resin optical fiber.

6. An impulse sensor, comprising:
a long elastic structure comprising a material to be deformed according to an impulse;
a plurality of protruding portions provided longitudinally along the long elastic structure at a predetermined pitch;
a cable insertion hole formed in the elastic structure; and
a cable inserted through the cable insertion hole, the cable being operable to acuse a variation in propagation energy due to its deformation,
wherein an outside diameter of the cable is varied in a longitudinal direction of the elastic structure, and
wherein the sensitivity of the impulse sensor for sensing the impulse is varied in positions longitudinally along the impulse sensor.

7. The impulse sensor according to claim 6, wherein:
the cable comprises a synthetic resin optical fiber.

8. An impulse sensor, comprising:
a long elastic structure comprising a material to be deformed according to an impulse;
a plurality of protruding portions provided longitudinally along the long elastic structure at a predetermined pitch;
a cable insertion hole formed in the elastic structure; and
a cable inserted through the cable insertion hole, the cable being operable to cause a variation in propagation energy due to its deformation,
wherein two or more of a distance from a central line of the cable to an outer surface of the elastic structure, an inside diameter of the cable insertion hole and an outside diameter of the cable are varied in a longitudinal direction of the elastic structure, and
wherein the sensitivity of the impulse sensor for sensing the impulse is varied in positions longitudinally along the impulse sensor.

9. An impulse sensor, comprising:
a long elastic structure disposed along a front bumper of a vehicle and comprising a material to be deformed according to an impulse;
a plurality of protruding portions provided longitudinally along the long elastic structure at a predetermined pitch;
a cable insertion hole formed in the elastic structure; and
a cable inserted through the cable insertion hole, cable being operable to cause a variation in propagation energy due to its deformation,
wherein one or more of a distance from a central line of the cable to an outer surface of the elastic structure, an inside diameter of the cable insertion hole and an outside diameter of the cable is different between a middle portion of the front bumper and an end portion of the front bumper in a longitudinal direction of the front bumper, and
wherein the sensitivity of the impulse sensor for sensing the impulse is varied in positions longitudinally along the impulse sensor.

10. The impulse sensor according to claim 9, wherein:
the distance from the central line of the cable to The outer surface of the elastic structure is shorter at the middle portion of the front bumper than that at the end portion of the front bumper in the longitudinal direction of the front bumper.

11. The impulse sensor according to claim 9, wherein:
the inside diameter of the cable insertion hole is smaller at the middle portion of the front bumper than that at the end portion of the front bumper in the longitudinal direction of the front bumper.

12. The impulse sensor according to claim 9, wherein:
the outside diameter of the able is greater at the middle portion of the front bumper than that at the end portion of the front bumper in the longitudinal direction of the front bumper.

* * * * *

UNITED STATES PATENT AND TRADEMARK OFFICE
CERTIFICATE OF CORRECTION

| | |
|---|---|
| PATENT NO. | : 7,520,157 B2 |
| APPLICATION NO. | : 11/649118 |
| DATED | : April 21, 2009 |
| INVENTOR(S) | : Tomiya Abe et al. |

It is certified that error appears in the above-identified patent and that said Letters Patent is hereby corrected as shown below:

Title Page - should read -

(73) Assignee:   Hitachi Cable, Ltd., Tokyo (JP)

Denso Corporation, Aichi (JP)

Signed and Sealed this

Thirtieth Day of June, 2009

JOHN DOLL
*Acting Director of the United States Patent and Trademark Office*